(12) United States Patent
Zen et al.

(10) Patent No.: US 7,988,030 B2
(45) Date of Patent: Aug. 2, 2011

(54) WAVE SOLDERING BATH

(75) Inventors: Mitsuo Zen, Souka (JP); Hirokazu Ichikawa, Souka (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 11/886,006

(22) PCT Filed: Mar. 7, 2006

(86) PCT No.: PCT/JP2006/304328
§ 371 (c)(1),
(2), (4) Date: Aug. 29, 2008

(87) PCT Pub. No.: WO2006/100899
PCT Pub. Date: Sep. 28, 2006

(65) Prior Publication Data
US 2009/0050674 A1    Feb. 26, 2009

(30) Foreign Application Priority Data
Mar. 18, 2005 (JP) .................................. 2005-078457

(51) Int. Cl.
*B23K 1/08* (2006.01)
(52) U.S. Cl. .............................. 228/37; 228/33; 228/260
(58) Field of Classification Search .................. 228/178, 228/179.1, 180.1, 4.1, 6.1, 6.2, 256–262, 228/33–43, 56.1–56.2
See application file for complete search history.

(56) References Cited

U.S. PATENT DOCUMENTS

| | | | | |
|---|---|---|---|---|
| 4,068,792 A | * | 1/1978 | Dixon | 228/57 |
| 4,802,617 A | * | 2/1989 | Deambrosio | 228/180.1 |
| 6,851,596 B2 | * | 2/2005 | Ogawa | 228/37 |
| 2004/0211816 A1 | | 10/2004 | Ogawa | 228/37 |

FOREIGN PATENT DOCUMENTS

| | | | |
|---|---|---|---|
| JP | 51 3632 | | 1/1976 |
| JP | 62 275567 | | 11/1987 |
| JP | 64 018568 | | 1/1989 |
| JP | 02205257 A | * | 8/1990 |
| JP | 4 006361 | | 1/1992 |
| JP | 2003332724 A | * | 11/2003 |
| JP | 2005 074478 | | 3/2005 |
| JP | 2005074478 A | * | 3/2005 |

OTHER PUBLICATIONS

Machine Translation of JP 2005-074478. Retrieved from JPO website.*

(Continued)

*Primary Examiner* — Emily Le
*Assistant Examiner* — Megha Mehta
(74) *Attorney, Agent, or Firm* — Michael Tobias

(57) ABSTRACT

In a conventional wave soldering bath, the bottom surface of a bath body in a position which is below the inlet of a duct underwent erosion by molten solder and had a hole formed therein, causing molten solder to be spilled out from the hole. The cause of erosion of the bottom surface of the bath body is a vortex (T) of molten solder formed below the duct inlet accompanying rotation of an impeller pump (10), and the vortex rubs the bottom surface of the bath body.

In the present invention, a shielding member (14) is installed between the duct inlet (12) and the bottom surface (13) of the bath body such that the vortex is prevented from affecting the bottom surface.

12 Claims, 3 Drawing Sheets

OTHER PUBLICATIONS

Shuichi Ono, "SP nitriding for long life of stainless soldering pot in Pb-free soldering", Journal of Advanced Science, vol. 16, No. 2 (Aug. 31, 2004), pp. i-5 to i-7.

Yoshinobu Anbe and Akiko Anbe, "Namari-free Flow Sochi Sentei Joken" ("Selection Criteria for Lead-Free Flow Equipment"), Jisso Gijutsu Guide Book 2004, Denshi Zairyo 7 Gatsugo Bessatsu (May 29, 2004), pp. 127 to 131.

* cited by examiner

WAVE SOLDERING BATH

TECHNICAL FIELD

This invention relates to a wave soldering bath for soldering of printed circuit boards with spouted molten solder.

BACKGROUND ART

Soldering of printed circuit boards which are incorporated into electric home appliances such as televisions and videos is carried out by flow soldering since such boards must be mass-produced inexpensively. Flow soldering can solder the entire surface of a printed circuit board in a single operation. Therefore, it is superior to other types of soldering with respect to mass productivity. An automatic soldering machine for carrying out soldering by flow soldering includes processing units such as a fluxer, a preheater, a wave soldering bath, and a cooler, and an endless conveyor runs above these processing units. When printed circuit boards are soldered in an automatic soldering machine, they successively undergo application of flux by the fluxer, preheating by the preheater, adhesion of solder in the wave soldering bath, and cooling by the cooler to perform soldering while they are transported by the conveyor. Each processing unit installed in an automatic soldering machine can be used for years under ordinary conditions of use, but a wave soldering bath has a shorter service life than the other processing units. The reason therefor is the occurrence of erosion of a wave soldering bath.

This erosion of a wave soldering bath is a phenomenon in which a constituent part of the wave soldering bath is locally worn away by the action of the molten solder contained therein. If erosion develops in a wave soldering bath, a hole forms in the body of the bath, causing molten solder at a high temperature to spill out. Molten solder which spills out of a wave soldering bath creates an extremely dangerous situation in which not only is the wiring of the automatic soldering machine or the floor of the workplace scorched, but in which workers carrying out soldering operations are burned. Therefore, some countermeasure is taken so that erosion does not take place in a wave soldering bath. The most effective countermeasure is to use stainless steel for the constituent parts of the wave soldering bath. Stainless steel has a strong oxide film of chromium or nickel formed on its surface, and this surface prevent direct contact of the metallic portion of stainless steel with the molten solder contained therein. As a result, with a stainless steel bath body, it is difficult for the molten solder to alloy with the stainless steel, and erosion of the bath body is decreased to that extent.

However, erosion sometimes takes place even with a stainless steel bath body. Thus, when the strong oxide film formed on the surface of stainless steel disappears and the metallic portion of clean stainless steel is exposed, erosion of stainless steel takes place. Namely, if the oxide film on the surface of stainless steel locally disappears for some reason, the Fe in the stainless steel and the Sn in the molten solder make an alloy. Since the resulting FeSn alloy has a decreased melting point, the alloy melts into the molten solder. This phenomenon spreads to the periphery and the interior, and eventually a hole forms in the stainless steel.

The cause of the local disappearance of an oxide film from the surface of the stainless steel of a wave soldering bath is that molten solder energetically flows in a wave soldering bath. The energetically flowing molten solder rubs the stainless steel bath body, whereby the oxide film on the surface of the stainless steel are physically peeled off. Therefore, erosion of a wave soldering bath develops frequently in a portion where there is energetic flow of molten solder. The portion where erosion occurs severely in a wave soldering bath is the periphery of a pump installed in the bath where the flow of molten solder is rapid and particularly in a portion of the bottom surface of the bath body which is situated beneath the pump installed in a duct.

A conventional wave soldering bath will be explained while referring to a FIG. 3. FIG. 3 is a front cross-sectional view of a conventional wave soldering bath. The body of the wave soldering bath 1 has the shape of a lidless box entirely made of stainless steel. Molten solder 3 is contained in the bath body 2 and is heated to a molten state and maintained at a predetermined temperature by an unillustrated electric heater. A first discharge nozzle 4 and a second discharge nozzle (not shown) are installed in the bath body 2. A large number of discharge holes 5 are bored in the first discharge nozzle 4.

The first discharge nozzle 4 is connected to a duct 6, and a flow straightening plate 8 having a large number of holes 7 bored therein is installed in the upper portion of the duct. An impeller pump 10 having a large number of blades 9 radially mounted thereon is installed in an end portion of the duct 6. A shaft 11 is secured to the upper portion of the impeller pump 10, an unillustrated sprocket is mounted on the upper end of the shaft, and the sprocket is driven by an unillustrated motor. An inlet 12 is formed in the duct 6 it its bottom portion where the impeller pump 10 is installed. The inlet 12 is slightly smaller in diameter than the diameter of the blades 9 radially mounted on the impeller pump 10.

The state of flow of molten solder in the above-described conventional wave soldering bath will be explained below. First, when the unillustrated motor is driven, the unillustrated sprocket is rotated, and the shaft 11 secured to the sprocket is rotated, thereby rotating the impeller 10 to which the shaft 11 is secured. As a result, the molten solder between the large number of blades 9 of the impeller pump is swept by the energy of rotation of the blades 9 and is transported horizontally inside the duct 6. Then the molten solder which is transported horizontally inside the duct 6 has its flow direction changed from horizontal to upwards and moves upwards, and as a result of this change of flow direction, the molten solder becomes turbulent. The molten solder which has become turbulent passes through the large number of holes 7 in the flow straightening plate 8 and undergoes flow straightening. The molten solder which underwent flow straightening by the flow straightening plate 8 is spouted from the large number of discharge holes 5 in the first discharge nozzle 4. The molten solder which is discharged from the large number of discharge holes 5 has a large number of surface irregularities or waves. A printed circuit board contacts the irregularly shaped molten solder and is soldered thereby. The irregularly shaped molten solder readily penetrates into through holes and comers of electronic parts and thus serves to eliminate unsoldered portions. However, the irregularly shaped flow forms bridges between adjoining portions being soldered, and it also forms icicles on the tips of leads. These are corrected by the gentle flow which is spouted from the unillustrated second discharge nozzle.

The situation in which a hole is formed in the bottom surface of the bath body of a conventional wave soldering bath having the above-described structure will be explained. When the impeller pump 10 rotates, the molten solder between the large number of blades 9 of the impeller pump is swept by the energy of the rotating blades and is sent into the duct 6. As a result, the impeller pump 10 sucks molten solder 3 below the duct through the inlet 12 into the space between the blades 9. Because the impeller pump 10 is rotating at this time, the rotation causes molten solder existing below the inlet 12 to rotate and produces a vortex T. Thus, molten solder forms a vortex T above the bottom surface 13 of the bath body 2 in a portion positioned below the inlet 12, and this vortex T rubs the bottom surface 13 of the bath body 2. As a result, the oxide film covering the surface of the stainless steel on the bottom surface 13 is removed so that the naked metal is exposed in that portion, and Fe in the stainless steel makes an alloy with Sn in the solder. As this alloying proceeds, it becomes erosion K and eventually a hole ends up forming in is the bottom surface 13.

The cause of erosion in a wave soldering bath is also related to the Sn content in the solder and the soldering temperature, i.e., the temperature of molten solder in the wave soldering bath. Namely, the higher the Sn content in solder used in a wave soldering bath, the more easily erosion occurs. This is because, as stated above, Fe in stainless steel alloys with Sn in the solder and thereby causes erosion, and the higher the content of Sn in solder, the more alloying with Fe progresses. In addition, the higher the temperature of molten solder in a wave soldering bath, the more easily erosion develops. This is because a higher temperature not only promotes alloying of Fe and Sn but the resulting alloy more easily melts into high temperature molten solder.

In the past, solder used in soldering of printed circuit boards was Pb-63Sn alloy solder. This solder has an Sn content of approximately 60%, and the temperature of solder in the wave soldering bath is 220-240° C. With this Sn content and solder temperature, it was difficult for erosion of stainless steel to take place. However, because conventional Pb—Sn solder contains Pb, its use has come to be regulated. Namely, in view of an adverse effect of Pb when it accumulates in the human body, "lead-free solder" containing no Pb has come to be used in recent years. Lead-free solder contains Sn as the main component (at least 95 mass percent), to which Ag, Cu, In, Bi, Zn, Ni, Cr, Mo, Ga, Ge, P, or the like is suitably added. Since lead-free solder containing Sn as a main component often has a melting point of at least 220° C., the soldering temperature, i.e., the temperature of molten solder in a wave soldering bath must also necessarily be made high, and in general it is 250-260° C. Thus, with lead-free solder, the Sn content is higher and the temperature of solder in a wave soldering bath is also higher compared to the past. As a result, erosion takes place more frequently in a wave soldering bath using lead-free solder.

DISCLOSURE OF INVENTION

There is no significant difference regarding structure and materials between a wave soldering bath designed for a conventional Pb-63Sn solder and a wave soldering bath designed for a recent lead-free solder. Therefore, if a lead-free solder is used in a wave soldering bath, erosion which did not take place with a Pb—Sn solder ends up occurring. As stated above, severe erosion using a lead-free solder takes place in a position of the bottom surface of a bath body below a duct where a pump is installed. If the bottom surface of the bath body is eroded and a hole formed in it, all of the molten solder in the wave soldering bath will spill out and create an extremely dangerous situation. The present invention provides a wave soldering bath with which it is difficult for the bottom surface of the bath body below a duct to undergo erosion even when using a lead-free solder.

In a wave soldering bath, the cause of the ready occurrence of erosion in the bottom surface of a bath body below the inlet of a duct is the formation of a vortex below the inlet of the duct. The present inventors realized that if a vortex which develops below the inlet of the duct can be prevented from affecting the bottom surface of the bath body, the bottom surface of the bath body will no longer be eroded. They thereby completed the present invention.

The present invention is a wave soldering bath having a duct installed inside the body of the bath and a pump installed at an end portion of the duct, the duct having an inlet formed below the pump, characterized in that a shielding member which prevents the bottom surface of the bath body from being affected by a vortex which develops below the inlet is installed between the inlet and the bottom surface of the bath body.

A wave soldering bath according to the present invention has a shielding member installed below an inlet beneath a pump. Therefore, even if a vortex develops above the shielding member, the vortex does not affect the bottom surface of the bath body, and as a result, the bottom surface of the bath body is not rubbed by a vortex of molten solder. Accordingly, in a wave soldering bath according to the present invention, the bottom surface of the bath body is not rubbed by molten solder and erosion does not develop therein, whereby the excellent effect that soldering operation can be safely carried out over long periods, which is not provided by a conventional wave soldering bath, can be obtained.

LIST OF REFERENCE NUMERALS

1: wave soldering bath, 2: bath body, 3: molten solder, 4: first discharge nozzle, 6: duct, 10: impeller pump, 12: inlet, 13: bottom surface of the bath body, 14: shielding member.

BEST MODE FOR CARRYING OUT THE INVENTION

A wave soldering bath according to the present invention has a shielding (baffling) member installed between the inlet of a duct and the bottom surface of a bath body. The shielding member may be mounted on the duct, or it may be mounted on the bottom surface of the bath body.

A shielding member installed in a wave soldering bath according to the present invention is made of the same material as the bottom surface of the bath body, i.e., of stainless steel when it is permissible for the shielding member to undergo erosion. However, when the shielding member is desired to withstand erosion, although somewhat expensive, titanium or zirconium to which molten solder does not adhere at all is used. In order to prevent erosion when using stainless steel, a coating such as a fluorocarbon resin may be provided on the surface of the stainless steel, or the surface of the stainless steel may be subjected to nitriding treatment. A non-metallic material such as a ceramic or a heat-resistant resin may also be used as a material to which molten solder does not adhere at all.

A shielding material used in a wave soldering bath according to the present invention can have any shape as long as it prevents a vortex formed below the inlet from affecting the bottom surface of the bath body. The shape of the shielding member may be a flat plate, a net, a punched plate, a cylinder, or the like.

Figure 1:
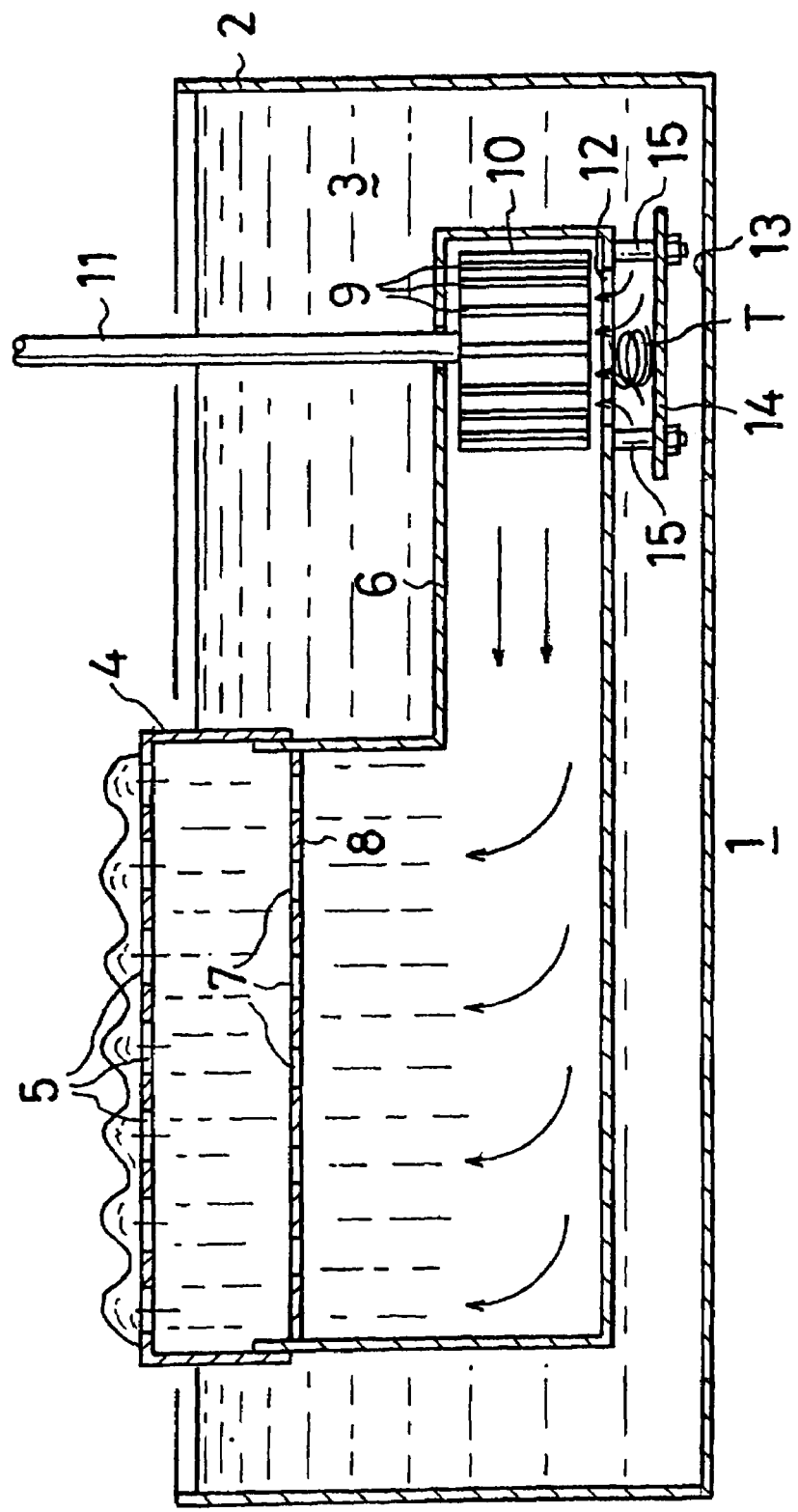
FIG. 1 is a front cross-sectional view of a wave soldering bath according to the present invention.
Figure 2:
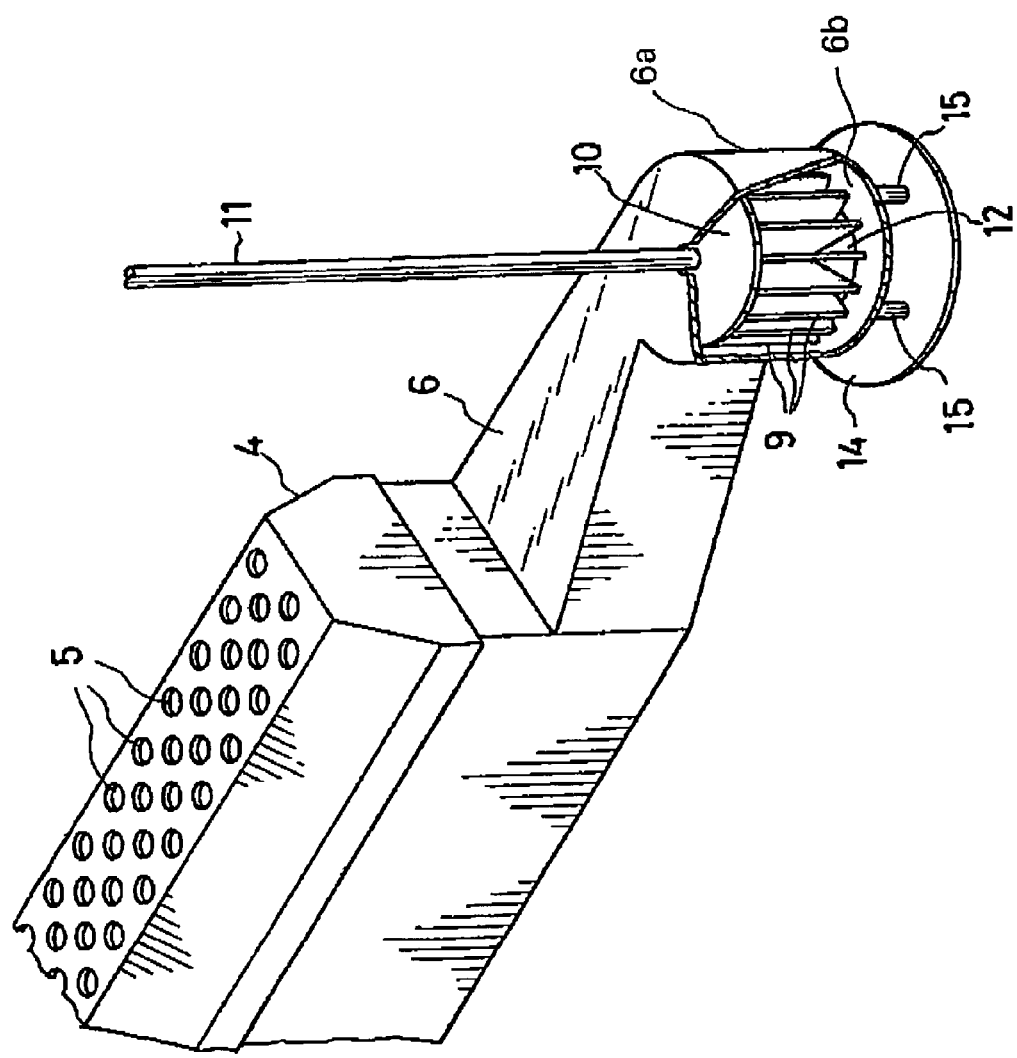
FIG. 2 is a perspective view of important components of the present invention.
Figure 3:
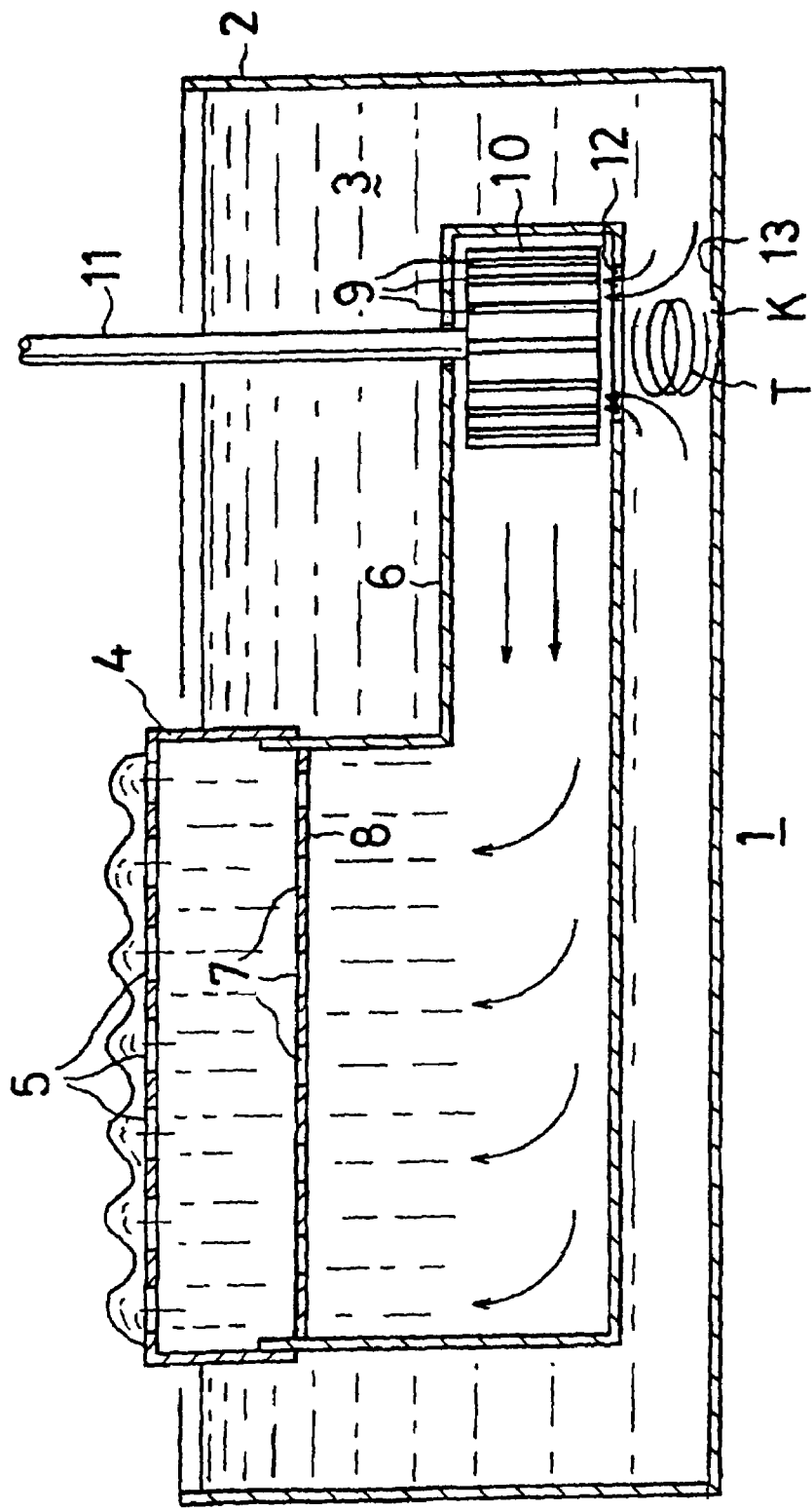
FIG. 3 is front cross-sectional view of a conventional wave soldering bath.

Next, a wave soldering bath to according the present invention will be explained based on the drawings. FIG. 1 is a front cross-sectional view of a wave soldering bath of the present invention, and FIG. 2 is a perspective view of important components thereof.

Parts of a wave soldering bath according to the present invention which are the same as in the above-described conventional wave soldering bath are affixed with the same reference numbers, so a detailed explanation of those parts will be omitted.

A duct 6 in which an impeller pump 10 is installed has an inlet 12 in the bottom portion thereof, and a shielding member 14 is installed between the inlet and the bottom surface 13 of a bath body 2. The shielding member has a circular shape having a larger diameter than the diameter of the inlet 12. The shielding member 14 is attached to lower portions of a plurality of suspension rods 15 which are secured to the bottom of the duct 6.

In a wave soldering bath according to the present invention having the above-described structure, even if the impeller 10 rotates and a vortex T develops in molten solder below the inlet 12 accompanying the rotation, the vortex occurs above the shielding member 14, so it does not have an effect on the bottom surface 13 of the bath body. When the shielding member is made of stainless steel, the vortex rubs the shielding member and removes oxides from the surface of the stainless steel so as to expose the naked metal, and the shielding member then undergoes erosion as a so-called sacrificial member, eventually leading to the formation of a hole in the member or chipping away of the periphery thereof. If a shielding member which is undergoing erosion in this manner is left for a long period, the shielding member ends up being almost entirely consumed, and it loses its effect as a shielding member. Therefore, it is necessary to inspect the shielding member at suitable times and to replace it when the amount of loss has become large. However, inspection is not performed just of the shielding member. Namely, in a wave soldering bath, oxides of solder adhere to the walls of the bath body, the walls of the duct, the flow straightening plate, and other locations over long periods of use, and the adhered oxides sometimes peel off during use and adhere to printed circuit boards. Therefore, a wave soldering bath is cleaned of adhered oxides periodically at predetermined intervals. Inspection of the shielding member can be carried out at the time of this periodic cleaning to remove adhered oxides.

INDUSTRIAL APPLICABILITY

In this embodiment of the present invention, a wave soldering bath having a first discharge nozzle installed therein was explained, but the present invention can also be applied to a second discharge nozzle.

The invention claimed is:

1. A wave soldering bath comprising a bath body, a nozzle disposed in the bath body, a pump chamber disposed in the bath body and fluidly communicating with the nozzle and having a bottom plate having an inlet formed therein, a pump disposed in the pump chamber above the inlet, and a shielding member disposed below the inlet between the inlet and a bottom inner surface of the bath body and spaced from the bottom plate of the pump chamber and from the bottom inner surface of the bath body and shielding the bottom inner surface of the bath body against erosion when a vortex develops below the inlet, the shielding member having an outer periphery which has a peripheral edge and which extends around a region on a top surface of the shielding member which surrounds a vertical projection of the entire inlet onto the shielding member, wherein molten solder in the solder bath can flow along a horizontal flow path extending continuously between a point inside the bath body located radially outside the peripheral edge of the shielding member with respect to a center of the pump and a point below the inlet between the shielding member and the inlet.

2. A wave soldering bath as claimed in claim 1 wherein the shielding member comprises a plate, a net, or a punched plate.

3. A wave soldering bath as claimed in claim 1 wherein the shielding member is detachably connected to the bottom plate.

4. A wave soldering bath as claimed in claim 1 wherein the shielding member is rigidly secured beneath the bottom plate.

5. A wave soldering bath as claimed in claim 1 wherein the shielding member is suspended from the bottom plate by a plurality of support members spaced from each other around the shielding member and secured to the bottom plate, spaces between adjoining support members defining a plurality of openings through which molten solder can flow into a space surrounding the inlet between the bottom plate and the shielding member.

6. A wave soldering bath as claimed in claim 5 wherein the shielding member is secured to the support members.

7. A wave soldering bath as claimed in claim 5 wherein the openings extend around most of a periphery of the shielding member.

8. A wave soldering bath as claimed in claim 6 wherein the shielding member is detachably secured to the support members.

9. A wave soldering bath as claimed in claim 5 wherein the support members comprise rods extending downwards from the bottom plate.

10. A wave soldering bath as claimed in claim 1 wherein the bath body contains molten solder and a vortex formed by the pump in the molten solder below the inlet and above the shielding member, the shielding member shielding the bottom inner surface of the bath body against erosion by the vortex.

11. A wave soldering bath as claimed in claim 1 wherein molten solder in the bath body can pass below the shielding member between the shielding member and the bottom inner surface of the bath body.

12. A wave soldering bath as claimed in claim 1 wherein the shielding member is spaced from the bottom plate far enough to enable a vortex to develop in molten solder between the inlet and the shielding member.

* * * * *